United States Patent [19]

Houghton

[11] Patent Number: 4,709,791
[45] Date of Patent: Dec. 1, 1987

[54] ADJUSTABLE DOUBLE-ACTING DAMPER

[75] Inventor: Benjamin T. Houghton, Tonawanda, N.Y.

[73] Assignee: Enidine Incorporated, Orchard Park, N.Y.

[21] Appl. No.: 737,326

[22] Filed: May 23, 1985

[51] Int. Cl.[4] ............................................. F16F 9/34
[52] U.S. Cl. .................................. 188/315; 137/901; 188/322.14
[58] Field of Search ............... 188/299, 285, 281, 278, 188/316, 322.19, 322.14, 322.15, 318; 267/8 R, 126; 137/513.5, 523, 901, 513.7; 91/443

[56] References Cited

U.S. PATENT DOCUMENTS

| | | | |
|---|---|---|---|
| 1,076,042 | 10/1913 | Kilgore | 188/281 |
| 1,525,487 | 2/1925 | Woolson | 188/299 |
| 1,957,658 | 5/1934 | Logan | 188/299 |
| 2,011,460 | 8/1935 | Snyder | 188/285 |
| 2,025,199 | 12/1935 | Funston | 267/8 R X |
| 2,040,262 | 5/1936 | Kruckenberg et al. | 188/299 |
| 2,048,037 | 7/1936 | Smith | 188/299 |
| 2,070,709 | 2/1937 | Carter | 188/299 |
| 2,108,881 | 2/1938 | Casper | 188/299 |
| 3,106,267 | 10/1963 | Clapp | 188/97 |
| 3,152,665 | 10/1964 | Dickenson et al. | 188/299 |
| 3,395,725 | 8/1968 | Roach | 188/322.13 X |
| 3,550,612 | 12/1970 | Maxon | 137/513.5 X |
| 3,991,863 | 11/1976 | Lee | 188/289 |
| 4,030,520 | 6/1977 | Sands | 137/513.7 X |
| 4,076,225 | 2/1978 | Houghton | 267/34 |
| 4,214,737 | 7/1980 | Blatt | 267/8 A |
| 4,291,787 | 9/1981 | Brentham | 188/318 |
| 4,465,166 | 8/1984 | Moore | 188/285 X |
| 4,493,659 | 1/1985 | Iwashita | 188/299 X |
| 4,513,845 | 4/1985 | Stephens et al. | 188/299 |

FOREIGN PATENT DOCUMENTS

2449236  9/1980  France ................................ 188/299

Primary Examiner—George E. A. Halvosa
Attorney, Agent, or Firm—Christel, Bean & Linihan

[57] ABSTRACT

A dashpot damper for acting between two objects subject to move toward and away from one another including a housing including an elongated cavity, a piston mounted within the housing cavity for reciprocating movement therealong and dividing the cavity into two variable-volume, hydraulic fluid chambers, and a network of passages permitting hydraulic fluid to flow between the two variable-volume chambers as the housing and piston move relative to one another in response to relative movements between the two objects utilizes unitary flow control cartridge mounted within the housing and defining a passageway through which hydraulic fluid is forced to flow when passing between the two variable-volume chambers. The flow control cartridge also includes a check valve device associated with the passageway for controllably restricting the flow of hydraulic fluid in one direction through the passageway and for permitting substantially unrestricted flow of hydraulic fluid in the other direction through the passageway. By controlling the flow of hydraulic fluid through the passageway in the one direction, the damping effect of the damper is controlled. The flow control cartridge can be constructed so as to provide either an adjustable or fixed restriction to the hydraulic fluid flow in the one direction.

17 Claims, 8 Drawing Figures

ADJUSTABLE DOUBLE-ACTING DAMPER

BACKGROUND OF THE INVENTION

This invention relates, generally, to devices for damping or cushioning the movement between two objects moving relative to one another, and relates more particularly to a new and improved dashpot type of damper.

The type of damper with which this invention is concerned commonly includes a housing assembly defining an elongated cavity for containing hydraulic fluid and a piston assembly having a head received by the elongated cavity for sliding movement in either of two directions therealong. The housing assembly is connectable to one of two objects movable toward or away from one another, and the piston assembly is connectable to the other of the two objects. The piston head is arranged in the elongated cavity so as to separate the cavity into two variable-volume chambers, and the housing assembly includes a network of hydraulic fluid flow passages in flow communication with the first and second chambers. As the two objects move toward one another, the piston moves in one direction relative to and along the cavity to force hydraulic fluid through the flow passages from one of the variable-volume chambers to the other. Similarly, as the two objects move away from one another, the piston moves in the other direction relative to and along the cavity to force hydraulic fluid through the flow passages from said other of the variable-volume chambers to said one chamber. For purposes of adjusting the damping or cushioning effect of a damper of the aforesaid described type, the damper includes adjustment mechanisms for varying the size or configuration of its flow passages to thereby vary the flow characteristics of hydraulic fluid moving between the two variable-volume chambers.

In the past, damper selection required extensive engineering time to determine the proper parameters under which a damper could best be utilized, with extensive testing, modification and re-testing. Accordingly, it would be highly desirable to provide a damper which substantially reduces complex motion analysis by allowing the user to determine an optimum setting, and then lock the damper in that position with a plug-in type self-contained unit, the unit allowing damping to be programmed or pre-determined for tension, compression or both, and the unit enabling the damper to be adjustable in compression and free-flow in tension or adjustable in tension and free flow in compression or both.

SUMMARY OF THE INVENTION

An object of the present invention is to provide a new and improved dashpot type damper.

Another object of the present invention is to provide such a damper having improved means for controlling the damping effect of the damper.

Still another object is to provide such a damper wherein the cushioning of movement between two objects toward and away from one another can be independently controlled.

Yet still another object of the present invention is to provide such a damper having damping-adjustment means which are easily accessible.

It is a more particular object of the present invention to provide such a damper which allows the user to determine an optimum setting and then lock the damper in that setting with a readily accessible, plug-in type self-contained unit which allows the damping to be programmed or pre-determined for tension, compression or both.

It is a more particular object of the present invention to provide such a damper having a readily accessible, plug-in type self-contained unit which enables the damper to be adjustable in compression and free-flow in tension or adjustable in tension and free-flow in compression or both.

A further object of the present invention is to provide such a damper which is economical to manufacture and effective in operation.

This invention resides in a new and improved damper for acting between two objects subject to relative movement, for example toward and away from one another.

The damper comprises piston means, housing means and hydraulic fluid flow control means. The piston means includes a head and a rod connected to the head for securement one of the two objects. The housing includes means for securement to the other of the two objects and includes means defining an elongated cavity for containing hydraulic fluid. The piston head is received by the elongated cavity so as to separate the cavity into first and second chambers and is adapted to slidably move relative to and along the elongated cavity and thereby vary the volumes of the first and second chambers in response to relative movement betweey the two objects connected to the housing means and piston means. The housing further includes means defining an access opening, a first passage, and a second passage wherein the first chamber communicates with the access opening through the first passage and the second chamber communicates with the access opening through the second passage. The hydraulic fluid control means includes a body sealingly accepted by the access opening and defines a passageway through the body providing flow communication between the first and second passages and thereby providing a flow path for hydraulic fluid forced to exit one of the first and second chambers as the volumes of the chambers are varied by the relative movement of the two objects. The flow control means further includes means associated with the defined passageway for controlling or metering the flow of hydraulic fluid in one direction therethrough so that as hydraulic fluid is forced to flow through the passageway in said one direction, the damping effect of the damper is controlled.

In accordance with this invention, the flow control means is a self-contained unit or cartridge which can be easily separated or detached from the remainder of the damper. Such features permit the flow control means to be cleaned, repaired or modified with no disassembly of the remainder of the damper. Furthermore, such features accommodate the replacement of one flow control means which provides preselected fluid flow characteristics with another flow control means which provide alternative fluid flow characteristics. Still further, since the flow control means effectively define a conduit portion of the flow path for hydraulic fluid moving between the first and second chambers, the defined conduit portion can be removed and altered to vary or adjust the damping effect of the damper.

In another aspect of this invention, the flow control means is a first flow control means for controlling hydraulic fluid flow in one direction between the first and second chamber, the housing includes means defining a second access opening arranged in flow communication with the passageway of the first control means, with the first passage and with the second passage, and the damper further includes a second hydraulic fluid flow control means for controlling hydraulic fluid flow in the direction between the first and second chamber opposite said one direction. Because the first and second control means are independent from one another, the damping effects of the damper as two objects move toward one another and as the two objects move away from one another can be independently controlled in tension and compression.

Other objects and advantages of this invention will become apparent upon reading the ensuing description with reference to the accompanying drawings.

DETAILED DESCRIPTION OF AN ILLUSTRATIVE EMBODIMENT

Figure 1:
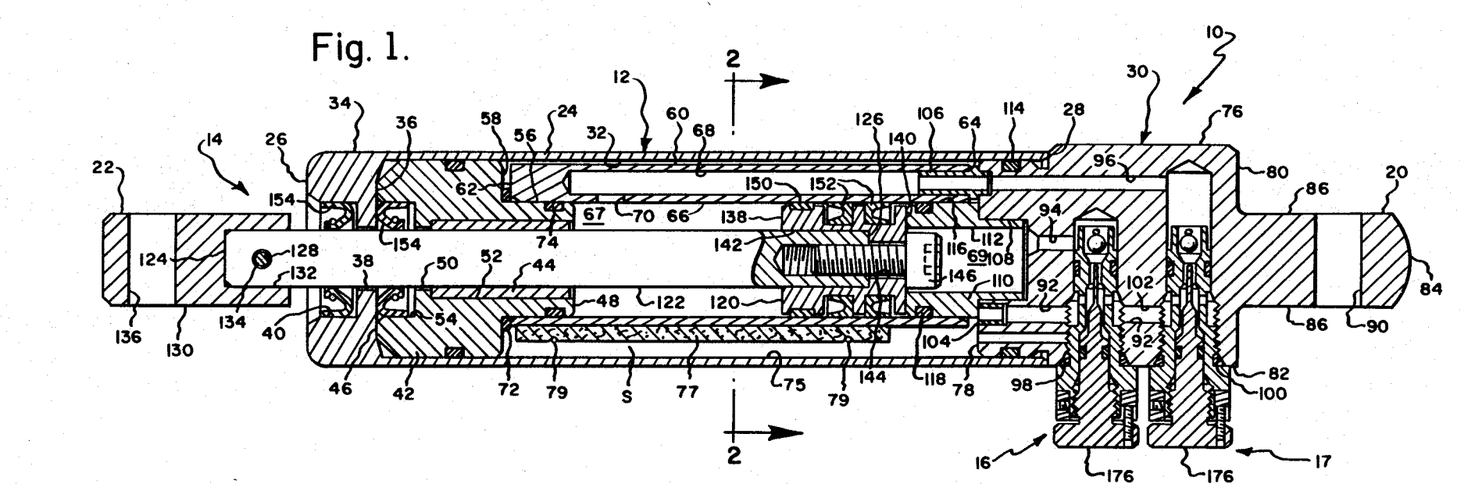
FIG. 1 is a longitudinal cross-sectional view of a damper constructed in accordance with this invention.

Referring now to the drawings in greater detail and considering first FIG. 1, there is shown a double-acting, linear tension and compression motion hydraulic damper, generally indicated 10, according to the present invention. The damper 10 includes housing means 12, a piston assembly 14, and hydraulic fluid flow control means 16 for controlling the flow of hydraulic fluid through the damper 10. For purposes of mounting the damper 10 between two distal objects (not shown) subject to move toward or away from one another, the housing means 12 includes a first clevis 20 and the piston assembly 14 includes a second clevis 22. Movement of the first clevis 20 and second clevis 22 toward or away from one another force the piston assembly 14 to move relative to and along the housing means 12 to thereby force damping fluid to flow through a network of passages, hereinafter described, in the housing means from a high pressure region to a lower pressure region. Between the high and lower pressure regions, the hydraulic fluid is routed through the control means 16 for purposes of controlling flow characteristics of the damping fluid and thereby controlling the damping effect of the damper 10.

The housing means 12 includes a cylindrical outer sleeve-like shell 24 having two opposite ends 26,28 and a manifold 30 fixedly attached to one end 28 of the sleeve-like shell 24. The shell 24 is formed of a suitable material, such as aluminium, and defines a relatively large central bore or region 32 extending from one end 28 of the shell 24 and along a substantial portion of the length of the shell 24. The end 28 of the shell 24 is substantially closed by the manifold 30. Included at the other end 26 of the shell 24 is a relatively thick end portion 34 defining an interior wall 36. The end portion 36 further defines a central through-bore 38 and a circular outer end recess 40 as shown in FIG. 1 of slightly larger diameter than that of the bore 38.

Positioned within the shell bore 32 and adjacent the shell end 26 is a bearing retainer 42 and a sleeve bearing 44. The bearing retainer 42 is constructed of steel and has a retainer body which is closely received by the shell bore 32. The retainer 42 includes two opposite ends 46,48 and defines a central through-bore 50, a slightly larger bore 42 extending inwardly of the retainer body from the retainer end 48 and a circular recess 54 extending inwardly of the retainer body from the retainer end 46. As shown in FIG. 1, the end 46 of the retainer 40 abuts the interior wall 36 of the shell end 26 and the sleeve bearing 44 is closely received by the retainer bore 52. The end 48 of the retainer body includes a reduced end portion 56 defining a shoulder 58.

Figure 2:
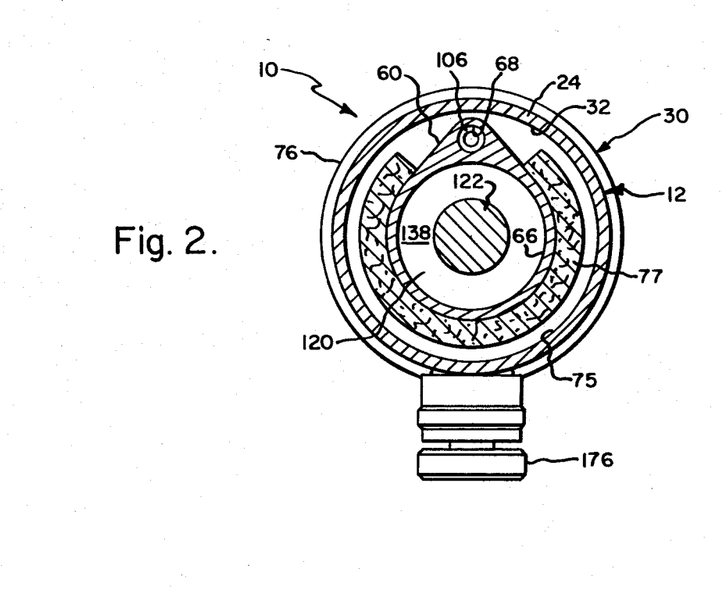
FIG. 2 is a cross-sectional view taken about on lines 2—2 of FIG. 1.

Referring to FIGS. 1 and 2, the housing means 12 further includes an elongated inner shock tube 60 positioned within the shell bore 32. The shock tube 60 includes two opposite ends 62,64, is constructed of aluminium and has a cross section (FIG. 2) which resembles the shape of a teardrop. A central through-bore 66 is defined in the tube 60 and a parallel bore 68 is defined in a portion of the tube 60 positioned adjacent the through bore 66. The bore 68 extends inwardly of the tube body from the tube end 64 and is of smaller diameter than the through-bore 66. An aperture 70 is spaced a short distance from the tube end 62 and permits the interior of the bore 66 to communicate with the interior of the bore 68. The tube end 62 is closely fitted about the reduced end portion 56 of the retainer 42 for attachment thereto, and the tube 60 and bearing retainer 42 are appropriately sealed with "O" rings 72,74.

The housing means 16 also includes an accumulator having a cavity, indicated 75, provided by the space S defined between the outer wall of the shock tube 60 and the inner wall of the shell 24. In accordance with this invention, a relatively thick layer of closed cell foam material 77 is supported within the accumulator cavity 75 for a purpose which will be set forth hereinafter. More specifically, the layer of foam 77 is wrapped about the shock tube 60 so as to cover a substantial portion thereof and held thereagainst with "O" rings 79,79.

As shown in FIG. 1, the manifold 30 includes a substantially cylindrical body 76 having two opposite ends 78,80 and an exterior sidewall, indicated 82, and is constructed of a suitable material, such as steel. The manifold end 80 of the body 76 includes a boss-like projecting end portion 84 having two diametrically opposed flat surfaces 84,86 and a through-bore 90. It will be understood that the damper clevis 22, introduced above, is provided by the boss-like end portion 84 of the manifold body 76.

The manifold body 76 further includes a series of parallel passageway bores 92,94 and 96 extending into the manifold body 76 from the manifold end 78 and two access openings or bores 98 and 100 opening out of the sidewall 82 of the manifold body 76. Each access opening 98 or 100 includes a portion adjacent the sidewall 82 which is internally-threaded for a reason which will be apparent hereinafter. As best shown in FIG. 1, the passageway bore 94 opens into the access opening 98, and the passageway bore 96 opens into the access opening 100.

As shown in FIG. 1, the manifold bore 92 is located in the manifold body 76 so as to communicated with each access opening 98 or 100, and a relief valve 104 or restrictor is supportedly mounted within the mouth of the bore 92. The manifold bore 94 is slightly offset from the center of the manifold body 76 as the body 76 is viewed in cross section and opens into the access opening 98. The manifold bore 96 opens into the access opening 100, and an apertured alignment pin 106 is supported within the mouth of the bore 96.

With reference still to FIG. 1, the end 78 of the manifold body defines a circular recess 108 within which is closely received a hollow cylindrical bushing member 110. The bushing member 110 is so arranged in relationship to the manifold body 76 that the manifold bore 94 opens into the hollow interior indicated 112 of the bushing member 110. The outer wall, indicated 116, of the bushing member 110 has a diameter which is slightly smaller than that of the shock tube bore 66.

The end 78 of the manifold body 76 is closely received by the end 28 of the housing shell 24 and is sealed there by an "O" ring 114. The manifold body 76 is so oriented in relationship to the housing shell 24 and shock tube 60 that the manifold bore 92 communicates with the accumulator cavity 75 through the relief valve or restrictor 104 and the manifold bore 96 communicates with the shock tube bore 68 through the alignment pin 106. The manifold bore 94 communicates with the interior 112 of bushing 110. The bushing 110 is closely received by the central bore 68 of the shock tube 60 and sealed therein with the "O" ring 118.

The piston assembly 14 includes a head 120, an elongated rod 122, and the clevis 22, introduced above. The elongated rod 122 has two opposite ends 124,126 and is of such cross-sectional dimension to be closely received by the sleeve bearing 44. The rod end 126 is internally threaded, as shown in FIG. 1, and the rod end 124 is provided with a through-aperture 128, as shown. The clevis 22 has a body 130 defining a circular recess 132 closely accepted about the rod end 124. The clevis 22 and rod end 124 are joined by a shanked fastener 134 extending through the rod aperture 128 and aligned openings in the clevis 22. For purposes of fastening the clevis 22 to one of the two objects subject to move toward or away from one another, the clevis body 130 includes a through-bore 136.

The piston head 120 includes a body defining two opposite faces 138,140 and of such size to be received within the cavity 66 of the shock tube 60 for sliding movement therealong. The head 120 includes a circular recess 142 extending into the body of the head 120 from the face 138 whereupon it meets a through-bore 144 for receiving the shank of the fastener 146. The recess 142 of the head 120 is accepted about the rod end 126 and the fastener 146 is threadedly accepted by the threads of the rod end 126 so that the head 120 is held upon the rod 122 between the head of the fastener 146 and the rod end 126. The body of the head 120 further defines a series of axially spaced annular grooves in the outer surface of head 120 and extending therearound within which a piston ring 150 and piston seals 152,152 are positioned for sealing the space between the walls of the cavity 75 and the piston head 120. For purposes of sealing between the piston rod 122 and housing means 12, rod seals 154,154 are positioned within recesses 40 and 54 of the housing shell 24 and bearing retainer 42, respectively.

It will be understood that the piston assembly 14 is slidably mounted within the housing means 12 for reciprocating movement of the piston head 120 relative to the elongated cavity 66 as the two objects to which the damper 10 is connected move toward and away from one another. It will also be understood that the piston head 120 effectively separates the cavity 66 into a first variable-volume chamber 67 and a second variable-volume 69 with the face 138 of the head 120 defining a wall of the first chamber 67 and the face 140 of the head 120 defining a wall of the second chamber 69. As movement of the piston head 120 relative to the cavity 66 increases the volume of the first chamber 67, the volume of the second chamber 69 decreases and vise-versa. It will also be understood, however, that since the piston rod 122 displaces volume only in the first chamber 67 and not the second, as the piston head 120 reciprocates within the cavity 66, the rate of change of the volumes of the first and second chambers 67 and 69 are unequal.

Figures 3, 5, 6, 7, 8:
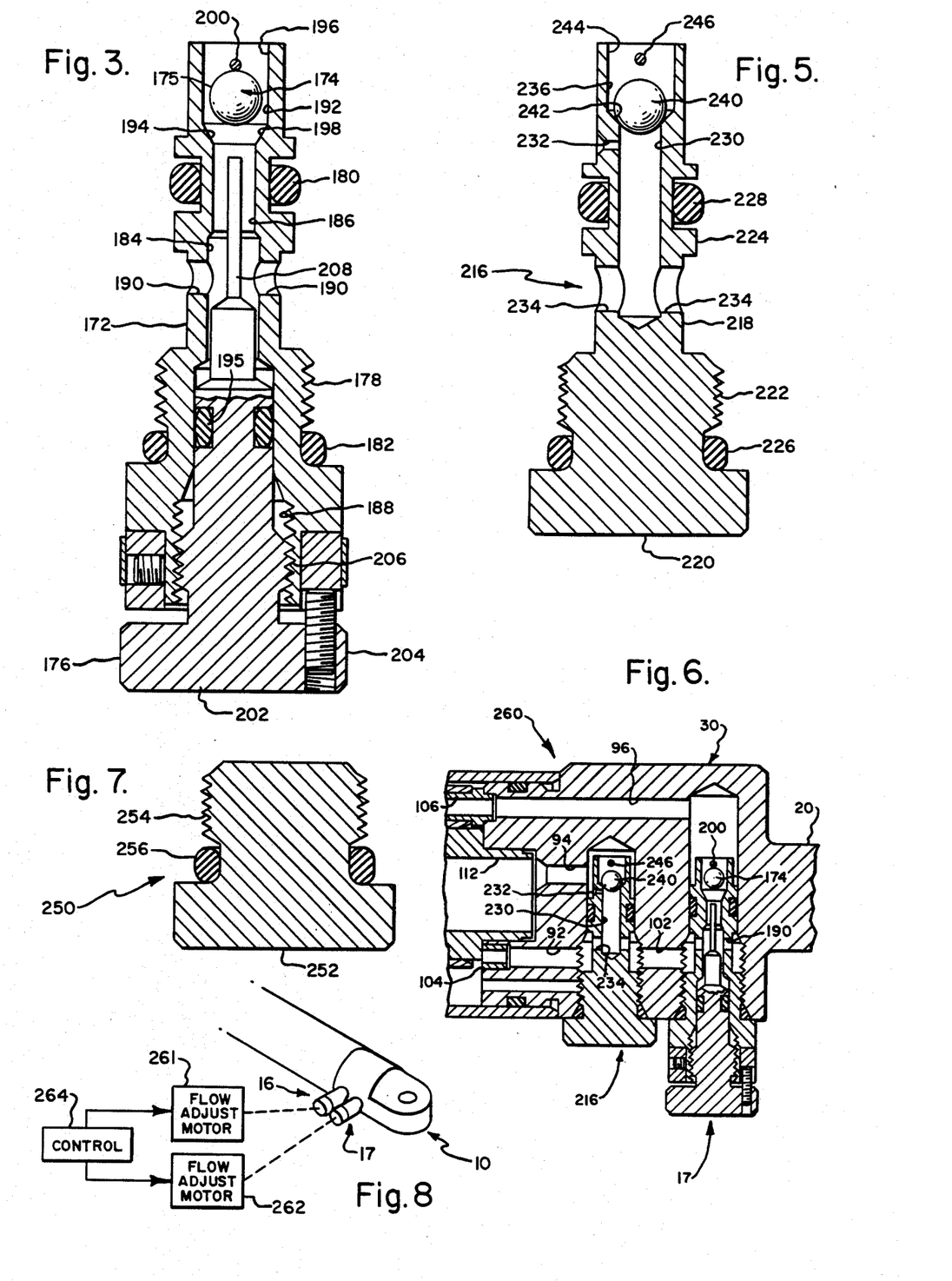
FIG. 3 is a longitudinal cross-sectional view of an adjustable hydraulic fluid flow control cartridge of the FIG. 1 damper drawn to a slightly larger scale.
FIG. 5 is a longitudinal cross-sectional view similar to FIG. 3 illustrating a fixed hydraulic fluid flow control cartridge.
FIG. 6 is a fragmentary view similar to that of FIG. 1 illustrating an alternative damper embodiment utilizing an adjustable flow control cartridge of FIG. 3 and a fixed flow control cartridge of FIG. 5.
FIG. 7 is a fragmentary longitudinal cross-sectional view similar to FIG. 3 illustrating a plug for an access opening of the FIG. 1 damper.
FIG. 8 is a view showing in block diagram form a control circuit for remote adjustment of the damping effect of the FIG. 1 damper.

With reference to FIGS. 1 and 3, the hydraulic fluid flow control means 16, 17 in accordance with the present invention, are identical and one of the flow control means, for example flow control means 16, is shown in FIG. 3 and is provided by an elongated cartridge body 172, a movable flow control element in the form of spherical ball 174 and adjustment means 176. The body 172 is of such shape and size to be sealingly accepted by either of the access openings 98 or 100 and includes an externally threaded portion 178 adapted to be threadably accepted by the internal threaded of the access opening thereof. "O" rings 180 and 182 positioned about the cartridge body 172 contribute to the seal between the body 172 and openings 98 or 100.

The cartridge body 172 defines an elongated open region 184 extending from one end of the body 172 to the other. The opening 184 includes an upper or passageway portion 186, as shown in FIG. 3, and a lower or supporting portion 188, as shown in FIG. 7, within which the adjustment means 176 are supported. The supporting portion 188 of the opening 184 is internally-threaded for a reason which will be hereinafter apparent. The body 172 further includes a transverse through bore 190 intersecting the passageway portion 186 of the opening 184.

In accordance with the present invention, the passageway portion 186 of the body opening 184 defines a ball chamber 192 having first and second ends 194 and 196, respectively, which are fluid inlets or outlets depending upon the direction of fluid flow as will be explained presently. The spherical ball 174 is loosely received or captured by the ball chamber 192 and is coated with resilient elastomer 175, for example urethane, to provide a soft seat and effective seal. The ball 174 is of such size and shape that if a fluid pressure differential exits between the inlet and outlet ends 194 and 196, the ball 174 is biased toward the chamber end having the lower fluid pressure. The end 194 includes a contoured, conical-shaped surface 198 defining a fluid opening having a smaller diameter than that of the ball 174 so that the ball 174 can seat on surface 198 and is prevented from passing out of the ball chamber 192 through the end 194. The opposite end 196 is relatively large in diameter, and a stop means in the form of pin 200 is supported transversely across the end 196 to prevent the ball 174 from passing out of the chamber 192 through the end 196.

The adjustment means 176 includes a plug 202 having a knob portion 204, a threaded securement portion 206 and an elongated stem portion 208. The threaded securement portion 206 is threadably received by the threaded supporting portion 188 of the cartridge body 172 and can be rotated therein by means of the knob portion 204. The stem portion 208 is of such shape and size to be received by the opening of the ball chamber end 194. The plug 202 and cartridge body 172 are sealed by means of an "O" ring 195.

Figure 4:
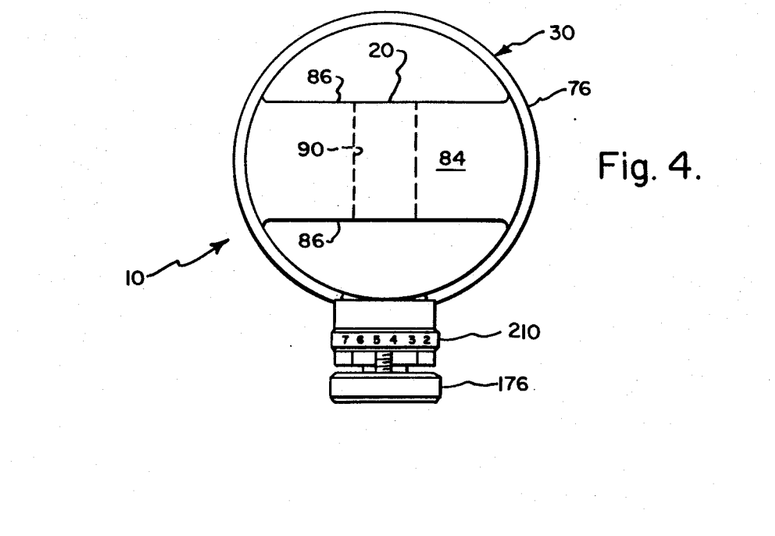
FIG. 4 is an end elevational view of the damper of FIG. 1 and taken from the right hand end as viewed in FIG. 1.

It will be understood from the above that the rotation of the plug 202 relative to the cartridge 172 bodily moves the plug 202 longitudinally of the cartridge body 172 and moves the outer or free end of the stem portion 208 into and out of the ball chamber 192. If the fluid pressure at the ball chamber end 194 is lower than the fluid pressure at the end 196 and the free end of the stem portion 208 is positioned within the ball chamber 192, the stem portion free end engages the ball 174 and prevents it from seating against the contoured surface 178 of the end 194. It will also be understood that by varying the distance that the stem portion free end is moved into the ball chamber 192, the positional relationship of the ball 174 and the ball chamber end 194 can be varied. In other words, adjustment means 176 moves the flow control element or ball 174 between a position seating against surface 194 and preventing or blocking flow in a direction from end 196 to end 194 and a position spaced from surface 194 by a selected amount to provide controlled or metered flow in a direction from end 196 to end 194. When flow is in the opposite direction, i.e. from end 194 to end 196, the flow control element or ball 194 allows substantially free flow and is baised by the fluid pressure against pin 200 as shown in FIG. 3. As shown in FIG. 4, the exterior surface of the cartridge body 172 bears suitable indicia 210 so that rotation of the knob portion 204 and thus the position of the stem portion free end within the ball chamber 192 and the distance ball 174 is spaced from surface 194 by action of the stem 208 can be selected.

Referring again to FIG. 1, there are shown two identical flow control means 16,17 sealingly received by the access openings 98 and 100, respectively. The passageway portions 186,186 of the cartridge bodies 172, 172 are in flow communication with one another through the portion 102 of the manifold bore 92, and the manifold bores 94 and 96 are in controlled flow communication with one another through the passageway portions 186,186. It follows that the first and second chambers 67,69 of the elongated cavity 66 are in controlled flow communication with one another through the passages defined by the housing means 12 and flow control means 16,17 and that a continuous, controlled flow path for hydraulic fluid forced to move from one cavity chamber to the other is thereby provided.

In a damping operation of the damper 10 during which the clevises 20 and 22 are forced to move toward one another in a compression mode so that the piston head 120 increases the fluid pressure within the second chamber 69 and decreases the fluid pressure within the first chamber 67, hydraulic fluid is forced to exit the second chamber 69 and move to the first chamber 67. Hydraulic fluid exiting the second chamber 69 through region 112 and manifold 94 passes into the access opening 98 and into the passageway portion 192 of the flow control means 16. In the ball chamber 192 of the flow control means 16, the ball 174 and outlet end 194 cooperate to permit fluid to pass out of the flow control means 16 at a controlled rate or metered. Passing out of the flow control means 16 and into the portion 102 of the manifold bore 92, hydraulic fluid flows substantially unrestricted to the first chamber 67 by means of the flow control means 17, manifold bore 96, shock tube bore 68, and shock tube aperture 70. In this mode, ball 174 of flow control means 17 abuts pin 200 thereby allowing substantially free flow in a direction into bore 96, the flow control means 17 operating like a check valve. It will be understood that by controlling the positional relationship between the ball 174 and ball chamber outlet end 194 of the flow control means 16 by its adjustment means 176, the relative movement between the piston head 120 and cavity 66, and thus the damping effect of the damper 10, in the compression mode is thereby controlled.

As discussed above, the volumes of the first and second cavity chambers 67 and 69 vary at different rates as the head 120 reciprocates within the cavity 66. Accordingly, hydraulic fluid which exits the second chamber 69 and cannot be accepted by the first chamber is forced into the accumulator cavity 75 through the relief valve 104. Because the accumulator cavity 75 contains the closed cell foam material 77, aeration of the hydraulic fluid entering the accumulator cavity 75 is prevented.

In a damping operation during which the damper clevises 20 and 22 are forced to move away from one another in a tension mode so that the piston head increases the fluid pressure within the first chamber 67 and decreases the fluid pressure within the second chamber 69, hydraulic fluid is forced to exit the first chamber 67 and move to the second chamber 69. Hydraulic fluid exits the first chamber 67 through opening 70 and flows along passage 68 and along manifold bore 96 into the second access opening 100 and into the passageway portion 192 of the flow control means 17. In the ball chamber 192 of the flow control means 17, the ball 174 and outlet end 194 cooperate to permit fluid to pass out of the flow control means 17 at a controlled or metered rate. Passing out of the flow control means 17 and into the portion 102 of the manifold bore 92, hydraulic fluid flows substantially unrestricted to the second chamber 69 by means of the flow control means 16 and manifold bore 94. In this mode, ball 174 of flow control means 16 abuts pin 200 thereby allowing substantially free flow in a direction into bore 94, the flow control means 16 operating like a check valve. Since the second chamber 69 accepts more hydraulic fluid than the first chamber 67 can supply during the tension mode, fluid is drawn out of the accumulator cavity through the relief valve 104 and flows through control means 16 into manifold bore 94. It will be understood from the above that by controlling the positional relationship between the ball 174 and ball chamber outlet end 194 of the flow control means 17 by its adjustment means 176, the relative movement between the piston head 120 and cavity 66, and thus the damping effect of the damper 10, in the tension mode is thereby controlled.

The aforedescribed damper 10 is advantageous in that the flow control means 16 and 17 permit independent control of the damping effects of the damper 10 when operating in its compression and tension modes. Furthermore, because the flow control means 16 and 17 are each self-contained units or cartridges containing the flow-control portion of the network of flow passages, the flow control means 16,17 can each be easily separated or removed from the remainder of the damper 10 for purposes of cleaning or repairing the flow control means 16 or 17 or for altering the flow control characteristics of the passageway portion 186 of the cartridge body 172. These latter alterations can be effected by modifying the shape or configuration of the ball chamber inlet end 194. To alter the rate of change of positional relationship between the ball 174 and ball chamber inlet end 194 as the knob portion 204 is rotated within the cartridge body 172, the pitch of the meshed threads of the cartridge body 172 and plug 202 can be modified.

Thus, the orifice ball 174 not only serves as a metering device but likewise as a check valve relief device. Flow through the metering cartridge 16,17 is orificed when the flow direction is from the orifice ball end and is free flow in the opposite direction, since it unseats the orifice ball 174. This dual function provides the desired damping in one direction and also insures rapid refill of the evacuated chamber when flow is in the opposite direction. The dual function of this orifice ball 174 eliminates the need for additional internal valving in the damper 10. The arrangement of passages or bores in manifold 30 is such that when tension motion takes place, the tension metering cartridge acts as a damping device, and the compression metering cartridge acts as a relief device. Conversely, when compression motion takes place, the compression metering cartridge acts as a damping device and the tension metering cartridge acts as a relief device. Since both of these metering cartridges 16,17 are identical, it is essential that the flow path design of manifold 30 be of a nature as to permit this dual function. The feature of independent tension and compression metering cartridges provides the unique ability to furnish the damper with tension damping and compression damping, tension damping and free flow compression motion, or compression damping and free flow tension motion. The latter two modes are accomplished by a form of flow control means which now will be described.

With reference to FIG. 5, there is shown another embodiment of flow control means, indicated 216, in accordance with the present invention. The flow control means 216 includes a cartridge body 218 having a cap portion 220, a threaded portion 222, and an extended portion 224. The threaded portion 222 is adapted to be threadably received by the threads of the damper access opening 98 or 100 with the extended portion 224 extending into the opening 98 or 100. "O" rings 226 and 228 contribute to the seal between the walls of the opening 98 or 100 and the cartridge body 218.

The extended portion 224 of the flow control means 216 defines an elongated aperture 230 extending longitudinally of the portion 224 and opening at the free end thereof. A small bore 232 extends transversely into the extended portion 224, and another, slightly larger bore 234 extends transversely through the extended portion 224. Both of the spaced-apart bores 232 and 234 intersect the elongated aperture 230, and bore 234 is located nearest the threaded portion 222.

The elongated aperture 230 defines a ball chamber 236 within which a flow control element in the form of spherical ball 240 is loosely received. The ball chamber 236 includes a first conically-shaped end 242 and a second relatively large end 244, the ends 242 and 244 being flow inlet or outlet ends depending upon the direction of flow as will be described. When the fluid pressure at a first end 244 exceeds the fluid pressure at the second end 242, the ball 240 is biased into engagement with the end 242 so that fluid is prevented from exiting the ball chamber 236 through the end 242. The spherical ball 240 is coated with a resilient elastomer, such as urethane, so as to provide a soft seat and effective seal between the inlet end 242 and ball 240. A stop means in the form of pin 246 is mounted across the end 244 to prevent the ball 240 from exiting the ball chamber 236. When the fluid pressure at the end 242 exceeds the fluid pressure at the end 244, the ball is biased into contact with the pin 246 and fluid is permitted to flow substantially unrestricted between the ball 240 and the walls of the ball chamber 236 and out of the chamber end 244.

With reference to FIG. 6, there is shown an alternative embodiment of a damper 260 within which is utilized flow control means 216 of FIG. 5 and flow control means 17 of FIGS. 1 and 3. Other components of the damper 260 which correspond to components of the damper 10 of FIG. 1 are accordingly given the same reference numerals. As shown in FIG. 6, the elongated opening 230 of the flow control means 216 communicates with the interior of the access opening 98 through the end 244 of the ball chamber 236 and through the small bore 232, and the bore 234 of control means 216 communicates with the portion 102 of the manifold bore 92.

In a compression mode operation of the damper 260 of FIG. 6 during which the damper piston head increases the fluid pressure within the second chamber 69 and decreases the fluid pressure within the first chamber 67 (FIG. 1), hydraulic fluid is forced to exit the second chamber 69 and move to the first chamber 67. Inasmuch as the fluid pressure decreases from the second chamber to the first through the network of flow passages provided by housing means 12, manifold 30 and flow control means 216,17 fluid pressure at the ball chamber end 244 is greater than the fluid pressure at the end 242 of control means 216 (FIG. 5) so that the ball 240 is forced to seat in the inlet end 242 and prevent fluid flow through the ball chamber 236. The small bore 232, however, permits hydraulic fluid to enter the elongated aperture 30 and out of the cartridge body 218 through the bore 234. Passing out of the flow control means 216 and into the manifold bore portion 102, hydraulic fluid flows substantially unrestricted to the first chamber 67. In particular, fluid flows from manifold bore portion 102 through control means 17 with the ball 174 thereof allowing substantially free flow and into manifold passage 96 and through passage 68 and opening 70 into chamber 67.

It will be understood from the above that control of the hydraulic fluid flow of the damper 260 during a compression mode, and thus the damping effect of the damper 260, is maintained by the size and shape of the small bore 232. The smaller the size of the bore 232, the higher the cushioning effect of the damper 260, and the larger the size of the bore 232, the lower the cushioning effect of the damper 260. The flow control means 216 is thereby a means for fixing the damping effect of the damper 260 is that once the control means 216 is installed, the damping effect of the damper 260 in a compression mode cannot be changed.

In a tension mode operation of the damper 260 of FIG. 6 during which the damper piston increases the fluid pressure within the first chamber 67 (FIG. 1) and decreases the fluid pressure within the second chamber 69, hydraulic fluid is forced to exit the first chamber 67 and move to the second chamber 69. Inasmuch as the fluid pressure decreases from the first chamber 67 to the second chamber 69 through the network of flow passages provided by the damper housing means 12, manifold 30 and flow control means 216,17, the fluid pressure at the ball chamber end 242 is greater than the fluid pressure at the opposite end 244. Consequently, the ball 240 moves into engagement with the pin 246 mounted in the ball chamber outlet end and hydraulic fluid is permitted to pass substantially unrestricted through the elongated aperture 230. Control over the damper effect of the damper 260 during a tension mode is maintained by the adjustable flow control means 17 discussed above.

The fixed flow control means 216 of FIGS. 5 and 6 may be preferred over the adjustable flow control means 16 or 17 of FIGS. 1 and 3 in applications where the damping effects of a damper need not be altered or should not be. The fixed flow control means 216 thus provides suitable means preventing the altering of damping effects until the carriage body 218 is removed or separated from the remainder of a damper.

It will also be understood that any two of several combinations of adjustable flow control means and fixed control means in accordance with this invention can be used within a damper of the aforedescribed construction in order to provide any of a number of damping effects. For example, inasmuch as the damper 260 of FIG. 6 has adjustable damping in tension and fixed damping in compression, the position of the two control means 216,17 can be exchanged so as to provide the resulting damper with adjustable damping in compression and fixed damping in tension. Furthermore, inasmuch as the damper 10 of FIGS. 1, 2 and 4 has adjustable damping on both tension and compression, the adjustable control means 16 and 17 can be easily replaced with fixed control means similar in structure to control means 216 of FIGS. 5 and 6 to provide the resultant damper with fixed damping in both tension and compression.

In applications in which a damper having fixed damping effect in one mode is desired, an adjustable flow control means in accordance with this invention can be initially used with the damper and adjusted until the desired damping effect in the one mode is obtained. The adjustable flow control means can then be replaced with a fixed control means to provide fluid flow control corresponding to that provided by the desired adjustment of the adjustable flow control means.

With reference to FIG. 7, there is shown a plug 250 having a cap portion 252, threaded portion 254 and "O" ring 256 adapted to be sealingly accepted by the threaded portion of a damper access opening 98 or 100. When installed in either access opening 98 or 100, substantially unrestricted fluid flow is permitted in either direction through the access opening 98 or 100. Thus, plug 250 may be utilized in a damper in which substantially unrestricted flow, and subsequently little damping effect, is desired in either a tension or a compression mode.

While the present invention has been described in a number of illustrated embodiments, it will be understood that numerous modifications and substitutions can be employed without departing from the spirit of the invention. For example, although the damper 10 has been described as having adjustable flow control means 16, 17 which can be manually adjusted by rotating the knob portions 176,176 thereof, it will be understood that adjustments of the damping effects of the damper 10 can be controlled automatically and remotely of the damper 10. The control schematic of FIG. 8 illustrates the adjusting operation of the damper 10 by means of two reversible motors 261,262 which can be stepping motors. The output shaft of each motor is connected to the knob of a corresponding one of the control means. Both of the motors 261,262 are operated by a control 264 which can be at a remote location if desired. By independently energizing the motors 261, 262 to rotate in one direction or the other in response to signals sent to it from the control 264, the knobs 176,176 of the flow control means are rotated to adjust the damping effects of the damper 10 in both tension and compression modes. Furthermore, only one flow control means can be motor operated, if desired especially in the situation where the other flow control means is of the fixed type.

It is therefore apparent that the present invention accomplishes its intended objects. While embodiments of the present invention have been described in detail, that is for the purpose of illustration, not limitation.

I claim:

1. A damper for acting between two relatively movable objects comprising:

housing means adapted to be operatively connected to one of said objects;

piston means comprising a head within said housing means and a rod extending from said housing means adapted to be operatively connected to the other of said objects, said housing means including means defining an elongated cavity for containing hydraulic fluid, said piston head being received by said cavity so as to separate said cavity into a first variable-volume chamber and a second variable-volume chamber and adapted to slidably move relative to and along the length of said elongated cavity and thereby vary the volumes of said first and second chambers in response to relative movement between said two objects toward and away from one another, said housing means further including means defining an access opening, a first passage and a second passage, said first chamber communicating with said access opening through said first passage and said second chamber communicating with said access opening through said second passage; and hydraulic fluid flow control means including a body sealingly accepted by said access opening and defining a passageway therethrough providing flow communication between said first and second passages and thereby providing a flow path for hydraulic fluid forced to flow between said first and second chambers as the volumes of said chambers are varied by said relative movement of said two objects toward and away from one another, said flow control means further including means associated with said body passageway for controlling the flow of hydraulic fluid in one direction through said passageway so that as hydraulic fluid is forced to flow through said passageway in said one direction, the damping effect of said damper is controlled, said passageway including a ball chamber having a flow inlet end and flow outlet end and said means associated with said passageway including a spherical ball received by said ball chamber, said ball adapted to be biased toward the ball chamber inlet or outlet end having the lower fluid pressure, one of said inlet and said outlet ends being of such a conformation that when hydraulic fluid pressure is lower at said one end than the fluid pressure at the other end, said ball and said one end cooperate to controllably restrict the flow of hydraulic fluid through said passageway, and the other of said inlet and said outlet ends being of such a conformation that when hydraulic fluid pressure is lower at said other end than the fluid pressure at said one end, said ball and said other end cooperate to permit substantially unrestricted flow of hydraulic fluid through said passageway, said one end of said ball chamber defining a contoured surface of such configuration that flow of hydraulic fluid through said one end is controlled by controlling the positional relationship of said ball to said contoured surface and said flow control means including adjustment means for adjusting the positional relationship of said ball to said contoured surface of said one end, said adjustment means including ball-engaging means mounted for movement relative to and within said body passageway for moving said ball relative to said contoured surface between one positional relationship with and within said ball chamber and another such positional relationship, said body of said control means defining an elongated opening extending therethrough, one portion of said elongated opening defining at least a portion of said passageway and another portion of said elongated opening is internally-threaded along the length of said opening, said adjustment means including a plug member having a securement portion and a stem portion attached to said securement portion, said securement portion being rotatably and threadably accepted by said threaded portion of said opening for bodily movement of said plug member relative to and along the length of said elongated opening as said securement portion is rotated relative to said body of said control means, and said stem portion extending from said securement portion and into said ball chamber and engageable with said ball for moving said ball between said one positional relationship with said contoured surface and another as said securement portion is rotated relative to said body.

2. A damper as defined in claim 1 wherein said body of said flow control means is releasably accepted by said access opening so as to permit said flow control means to be easily separated from the remainder of said damper.

3. A damper as defined in claim 1, wherein said spherical ball is coated with a resilient elastomer.

4. A damper as defined in claim 1 wherein said access opening is a first access opening, said flow control means is a first control means for controlling hydraulic fluid flow in one direction between said first and second chambers, said housing means includes means defining a second access opening arranged in fluid communication with said passageway of said first control means, with said first passage and with said second passage, and said damper further comprises:

a second self-contained hydraulic fluid flow control means including a body sealingly accepted by said access opening and defining a passageway through said body of said second flow control means providing flow communication between said first and second passages and thereby providing a flow path for hydraulic fluid forced to flow between said first and second chambers, said second flow control means further including means associated with passageway for controlling the flow of hydraulic fluid therethrough in the direction opposite said one direction so that as hydraulic fluid is forced to flow through said passageway of said second flow control means, in said opposite direction, the damping effect of said damper is controlled.

5. A damper as defined in claim 4 wherein said passageway of said second flow control means includes a ball chamber having a flow inlet end and a flow outlet end and said means associated with said passageway includes a spherical ball received by said ball chamber, said ball adapted to be biased toward the ball chamber inlet or outlet end having the lower fluid pressure, one of said inlet and said outlet ends being of such a conformation that when hydraulic fluid pressure is lower at said one end than the fluid pressure at the other end, said ball and said one end cooperate to controllably restrict the flow of hydraulic fluid through said passageway, and the other and said inlet and said outlet ends being of such a conformation that when hydraulic fluid pressure is lower at said other end than the fluid pressure at said one end, said ball and said other end cooperate to permit substantially unrestricted flow of hydraulic fluid through said passageway.

6. A damper as defined in claim 4, wherein said means associated with said body passageway of said second control means comprises:
(a) a flow control element movable in said passage between a first position blocking fluid flow in said one direction and a second position allowing substantial fluid flow in said one direction; and
(b) adjustment means operatively contacting said flow control element for varying the location of said flow control element relative to said first position thereby metering the fluid flow in said one direction.

7. A damper as defined in claim 4, wherein said means associated with said body passage of said second flow control means comprises:
(a) a flow control element freely movably in said passage between a first position blocking fluid flow in said one direction and a second position allowing free flow in the opposite direction;
(b) adjustment means operatively contacting said flow control element relative to said first position thereby metering the fluid flow in said one direction; and
(c) stop means for engaging said flow control element at said second position during free flow in the opposite direction.

8. A damper as defined in claim 4, wherein said body of said second flow control means is releasably accepted by said second access opening so as to permit said second flow contact means to be separated from the remainder of said damper.

9. A damper as defined in claim 1 wherein the volumes of said first and second chambers are adapted to vary at unequal rates during operative cycles of said damper and said housing means includes an accumulator defining an accumulator cavity in flow communication with one of said first and second passages for accumulating and releasing hydraulic fluid during operative cycles of said damper and thereby compensating for the inequality of rates of volmetric change between said first and second chambers.

10. A damper as defined in claim 9 further comprising a closed cell foam material supported within said accumulator cavity for preventing aeration of hydraulic fluid contained therein.

11. A damper as defined in claim 1 wherein said adjustment means inludes means for altering the location of said flow control element relative to said first position remotely of said damper.

12. A damper as defined in claim 11 wherein said adjustment means includes plug means mounted within said body and relatively rotatable therein for altering the location of said control element relative to said position as said plug means is rotated relative to said body and a motor for rotating said plug means relative to said body in response to commands received from the operator.

13. A damper as defined in claim 12 wherein said plug means is mounted within said body so that clockwise rotation of said plug means relative to said body increases resistance to hydraulic fluid flow in said one direction through said body passageway and counterclockwise rotation of said plug means relative to said body decreases resistance to hydraulic fluid flow in said one direction and said motor is reversible.

14. A damper as defined in claim 1, further comprising:
means for releasably locking the position of said securement portion relative to said body to thereby releasably lock the positional relationship of said ball with said contoured surface.

15. In a damper for acting between two objects subject to relative movement including a housing assembly defining an elongated cavity for containing hydraulic fluid, a piston assembly including a head slidably received by said cavity and separating said cavity into a first chamber and a second chamber and means supported by said housing defining a flow passage communicating between said first chamber and said second chamber, said housing and said piston assembly adapted to be operatively connected to a corresponding one of said two objects so that as said two objects move relative to each other, said piston head reciprocates in said cavity and forces hydraulic fluid to flow through said flow passage between said first and second chambers, the improvement comprising:
flow control means operatively associated with said flow passage-defining means and including a body defining a passageway portion of said flow passage and means associated with said passageway portion for metering the flow of hydraulic fluid in one direction through said passageway portion so that as hydraulic fluid is forced to flow through said passageway portion in said one direction, the damping effect of said damper is controlled, and for allowing substantially unrestricted flow of hydraulic fluid in the other direction through said passageway portion, said passageway portion including a ball chamber having a flow inlet end a flow outlet end and said means associated with said passageway portion including a spherical ball received by said ball chamber, said ball adapted to be biased toward the ball chamber inlet or outlet end having the lower fluid pressure, one of said inlet and said outlet ends being of such a conformation that when hydraulic fluid pressure is lower at said one end than the fluid pressure at the other end, said ball and said one end cooperate to controllably restrict the flow of hydraulic fluid through said passageway portion, and the other of said inlet and outlet ends being of such a conformation that when hydraulic fluid pressure is lower at said other end than the fluid pressure at said one end, said ball and said other end cooperate to permit substantially unrestricted flow of hydraulic fluid through said passageway, said one end of said ball chamber defining a contoured surface of such configuration that flow of hydraulic fluid through said one end is controlled by controlling the positional relationship of said ball to said contoured surface and said flow control means including adjustment means for adjusting the positional relationship of said ball to said contoured surface of said one end, said body of said flow control means defining an elongated opening extending therethrough, one portion of said elongated opening defining at least a section of said passageway portion and another section of said elongated opening is internally threaded along the length of said opening, said adjustment means including a plug member having a securement portion and a stem portion attached to said securement portion, said securement portion is rotatably and threadably accepted by said threaded portion of said elongated opening for bodily movement of said plug member relative to and along the length of said elongated opening as said securement portion is rotated relative to said body of said control means, and said stem portion extends from said securement portion and into said ball chamber and is engageable with said ball for moving said ball between one positional relationship with said contoured surface and another as said securement portion is rotated relative to said body.

16. The improvement of claim 15 further comprising:
means for releasably locking the position of said securement portion relative to said body to thereby releasably lock the positional relationship of said ball with said contoured surface.

17. The improvement of claim 15 wherein said spherical ball is coated with a resilient elastomer.

* * * * *